United States Patent [19]
Rafn

[11] Patent Number: 5,607,251
[45] Date of Patent: Mar. 4, 1997

[54] QUICK COUPLER ASSEMBLY FOR HANGING ATTACHMENT

[75] Inventor: Mark D. Rafn, Two Harbors, Minn.

[73] Assignee: The Stanley Works, New Britain, Conn.

[21] Appl. No.: 626,827

[22] Filed: Apr. 3, 1996

[51] Int. Cl.⁶ .................................................. F16B 7/00
[52] U.S. Cl. ..................... 403/348; 403/316; 37/468; 37/406; 414/723
[58] Field of Search ................... 403/348, 349, 403/322, 321, 315, 316, 317, 319, 24, 350; 37/403, 468, 406, 404–409; 172/438; 414/722, 723, 912

[56] References Cited

U.S. PATENT DOCUMENTS

| | | |
|---|---|---|
| 3,600,735 | 8/1971 | Jerabek . |
| 3,860,209 | 1/1975 | Strecker ........................... 403/348 X |
| 4,400,856 | 8/1983 | Tseng ............................... 403/348 X |
| 4,532,672 | 8/1985 | Anderson ......................... 403/349 X |
| 4,756,638 | 7/1988 | Neyret . |
| 4,944,628 | 7/1990 | Hulden ............................ 37/468 X |
| 4,990,022 | 2/1991 | Watanabe et al. . |
| 5,133,617 | 7/1992 | Sokn et al. ...................... 403/349 |
| 5,141,386 | 8/1992 | Barwise . |
| 5,195,865 | 3/1993 | Koehl .............................. 414/723 |
| 5,205,789 | 4/1993 | Falgout, Sr. . |
| 5,233,912 | 8/1993 | Mueller . |
| 5,261,758 | 11/1993 | Vranish . |
| 5,467,542 | 11/1995 | Hulden ............................ 37/468 |

FOREIGN PATENT DOCUMENTS

575658  2/1946  United Kingdom ................. 403/348

Primary Examiner—Harry C. Kim
Attorney, Agent, or Firm—Pepe & Hazard

[57] ABSTRACT

A coupling for releasably attaching a tool to the boom of a material handler includes a receiver having attachment member on one end, a generally circular cavity in the other end, and a plurality of circumferentially spaced arcuate ribs intermediate the axial length thereof defining an axially extending circular passage centrally thereof and axially extending channels between the spaced ends thereof. Stops on one end of the ribs extending upwardly and stops on the other end extend downwardly. A connector has one end portion seated in the receiver passage with radially extending lugs extending under the ribs. A locking member is movably seated in a passage in the receiver to preclude rotation of the connector.

19 Claims, 5 Drawing Sheets

QUICK COUPLER ASSEMBLY FOR HANGING ATTACHMENT

BACKGROUND OF THE INVENTION

The present invention relates to a quick coupling mechanism for attachment to the boom structure of a material handling vehicle such as a hydraulic excavator to couple a tool thereto and more particularly, to such a quick coupling mechanism which provides continuous rotation of the attached tool.

Material handling vehicles in demolition applications are commonly fitted with hanging-type tools such as clam shells, grapples and magnets, and generally these are removably attached to the end of a boom structure. It is often desirable that these tools be able to pivot and rotate with respect to the boom, and the coupling must be extremely durable. In some instances, the freedom of movement of the coupling is often sacrificed to increase its durability.

Conventional methods of coupling a tool to the boom structure of a material handling vehicle have disadvantages such as requiring two or more persons to align the mating surfaces of the coupling and tool, and requiring the engagement of multiple fasteners to secure the elements together. Moreover, couplings with numerous moving components have an increased tendency to fail.

Lastly, since most of the tools are hydraulically actuated, hydraulic fluid must be provided through or about the coupling to power the tool, and this often makes assembly more difficult and laborious.

It is an object of the present invention to provide a novel coupling for attaching a tool to the boom of a material handling vehicle while enabling relative rotational movement of the tool.

It is also an object to provide such a coupling which is readily installed on the boom of a material handling vehicle.

Another object is to provide such a coupling on which the tool may be readily locked.

A further object is to provide such a coupling through which hydraulic fluid may be transmitted from the boom to power the tool.

SUMMARY OF THE INVENTION

It has now been found that the foregoing and related objects may be readily attained in a coupling for releasably attaching a tool to the boom of a material handler, comprising a receiver having (i) attachment means on one end adapted for mounting on one of a tool and the boom of a material handler, (ii) a generally circular cavity in the other end thereof, (iii) a plurality of circumferentially spaced ribs of arcuate configuration extending radially inwardly of the cavity intermediate the axial length thereof and defining an axially extending circular passage centrally thereof and axially extending channels between the spaced ends thereof, the surface of the ribs facing the other end providing a guide surface and the opposite surface providing a retention surface, (iv) first stops on one circumferential end of the ribs extending axially toward the other end of the receiver, (v) second stops on the other circumferential end of the ribs extending axially toward the one end of the receiver, the circumferential spacing between the spaced ends of the ribs and the first and second stops defining the axially extending channels.

A connector has (i) one end portion of generally circular cross section seated in the circular passage of the receiver, and (ii) a plurality of circumferentially spaced, radially extending lugs adjacent the end of the one end portion extending under the retention surface of the ribs and abutting the second stops. The lugs are cooperatively dimensioned and configured with respect to the axially extending channels to permit passage of the lugs therethrough. Attachment means is provided on its other end and is adapted for mounting on the other one of the tool and boom.

Lastly, a locking member is movably seated in a passage in the receiver and has an inner end portion abutting one of the lugs to preclude rotation of the connector in the circular passage of the receiver, and means for effecting the movement of the inner end portion in the circular passage to free the one lug and thereby the connector for rotation. As a result, the connector may be coupled to the receiver by moving the connector axially into the passage in the one end of the receiver until the lugs abut the guide surface of the ribs, and effecting relative rotation of the connectors toward the axially extending channels until the lugs abut the first stops and are in axial alignment with the channels. The connector is then moved further into the circular passage of the receiver and the lugs axially in the channels. At this point relative rotation causes the lugs to abut the second stops.

In the preferred embodiment, the circumferential surface of the circular cavity at the other end of the receiver tapers radially inwardly to guide the connector into a position coaxial with the circular passage of the receiver to effect such guidance, the connector also has a chamfered surface to guide the one end of the connector into a coaxial position. The radially inner faces of the first stops have chamfered positions to help guide the connector into a position coaxial with the passage of the receiver during insertion of the connector into the receiver.

Desirably, the first stops, second stops and lugs are equal in number, preferably three, wherein the member is there, and wherein the first stops, second stops and the lugs are circumferentially spaced apart at 120° intervals.

Generally, the passage seating the locking member secantally intersects the circular passage of the receiver. Preferably, the body of the locking member is of generally cylindrical cross section and wherein the inner end portion thereof is of semicylindrical cross section with the arcuate surface abutting the one lug. The means for effecting movement of the locking member in the passage includes means for effecting the rotation of the locking member between a first position where the arcuate surface of the semicylindrical inner end portion abuts the one lug, and a second position wherein the planar surface of the semicylindrical inner end portion is disposed adjacent but spaced from the one lug to enable the connector to rotate. Also included is means for indicating whether the locking member is in the first or second position.

Desirably, the means for effecting movement of the locking member outwardly of the circular passage includes means for effecting the axial movement of the locking member between a first axial position in which the semicylindrical inner end portion is abutting the one lug, and a second position in which the inner end portion is spaced from the one lug. There is also means for indicating whether the locking member is in the first or second position.

In the preferred embodiments, the one end portion of the connector is of generally annular cross section and includes means for supplying hydraulic fluid in the passage therethrough to supply hydraulic power to the tool. This includes a cylindrical hydraulic oil distributor coaxially mounted within the annular end portion of the connector.

Desirably, the connector includes a rotatable element to enable rotation of the one end portion relative to the receiver.

DETAILED DESCRIPTION OF THE PREFERRED EMBODIMENT

Figure 1:
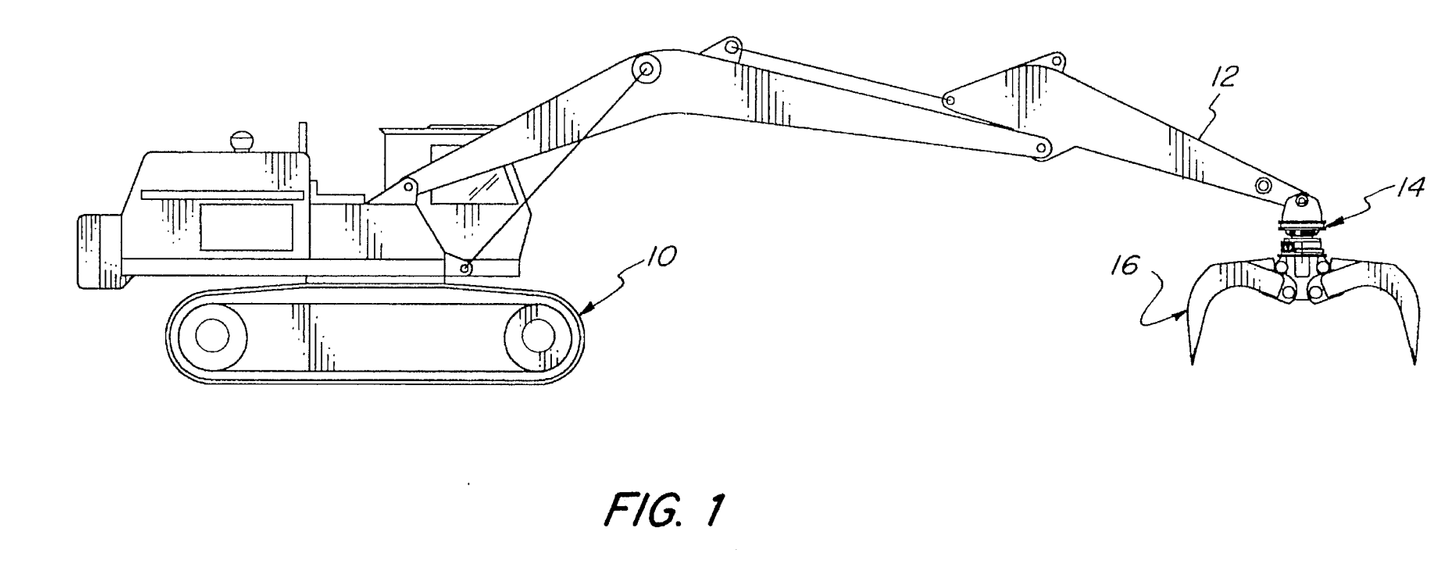
FIG. 1 is a side elevational view of an excavator having a grapple mounted on the boom by a coupling embodying the present invention.

Turning first to FIG. 1, therein illustrated is a hydraulic excavator generally designated by the numeral 10 and having a boom 12. The coupling assembly embodying the present invention is generally designated by the numeral 14, and releasably and rotatably mounts a grapple 16 on the end of the boom 12. The coupling 14 is comprised of a rotatable connector generally designated by the numeral 18 which is pivotally secured to the boom 12 and a receiver generally designated by the numeral 20 which is secured to the tool 16. The receiver is releasably secured to the connector 18 by the locking mechanism 22.

Figure 3:
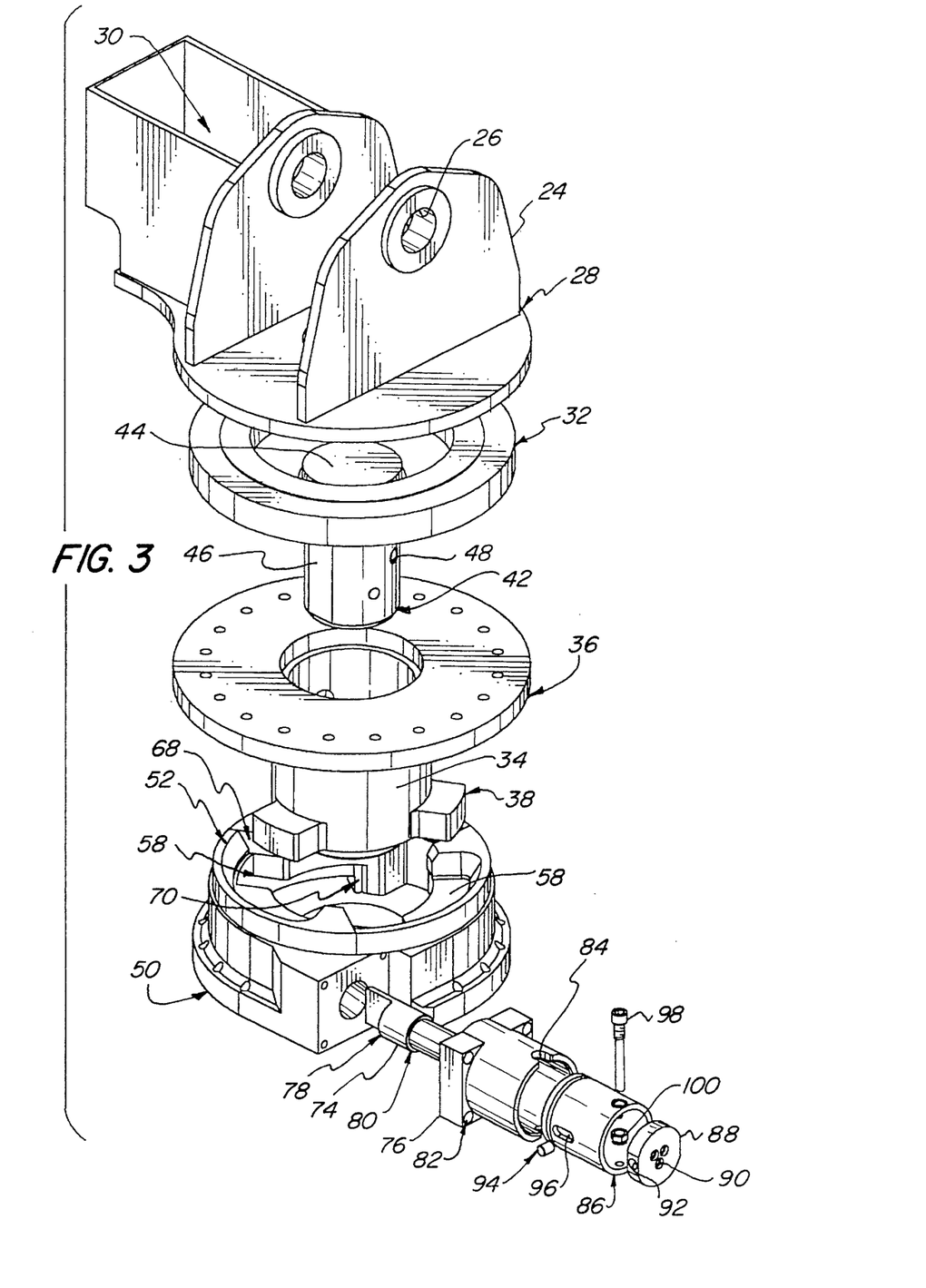
FIG. 3 is an exploded view of the coupling.

Turning in detail to the connector 18 as seen in FIG. 3, it includes a base plate 28 upon which are two spaced rigid plates 24 which extend upwardly therefrom. At their upper ends are pivot apertures 26 through which a pin is inserted to pivotally mount the connector 18 on the boom 12. A hydraulic drive motor (not shown) to rotate the tool 16 is housed inside the motor box 30 and is fastened to the top of the turntable base plate 28 by bolts (not shown). The top of an annular shaped turntable bearing 32 has gear teeth (not shown) about its outer ring and the inner ring is bolted to the bottom of the turntable base plate 28. The outer ring 32a is engaged with a pinion (not shown) driven by the hydraulic motor to rotate the lower portion of the connector 18.

The connector 18 also includes an extruded tube 34 with a flange 36 about its upper end which is bolted to the bottom side of the turntable bearing outer ring 32. The tube 34 extends downwardly from the flange 36 and has three circumferentially spaced, radially extending lugs 38 adjacent, but spaced upwardly from, its lower end and which interlock with the receiver 20. The outer periphery of the lower end of the tube 34 is chamfered to facilitate insertion of the connector 18 into the receiver 20.

A rotary hydraulic oil distributor 42 for supplying hydraulic oil to hydraulically power the tool 16 is bolted to the bottom of the turntable base plate 28 and is disposed within the upper portion of the tube 34 adjacent the flange 36. The oil distributor 42 includes an elongated cylindrical spool 44 which is coaxially mounted within a generally cylindrical housing 46 and has internal passages separated by seals (not shown) so that the spool 44 and the housing 46 may revolve freely with respect to each other. The housing 46 includes multiple oil delivery ports 48 along its periphery which are connected to fittings (not shown) passing through the open end 40 of the tube 34 and are operably connected to the tool 16 to supply it with hydraulic power.

Figure 2:
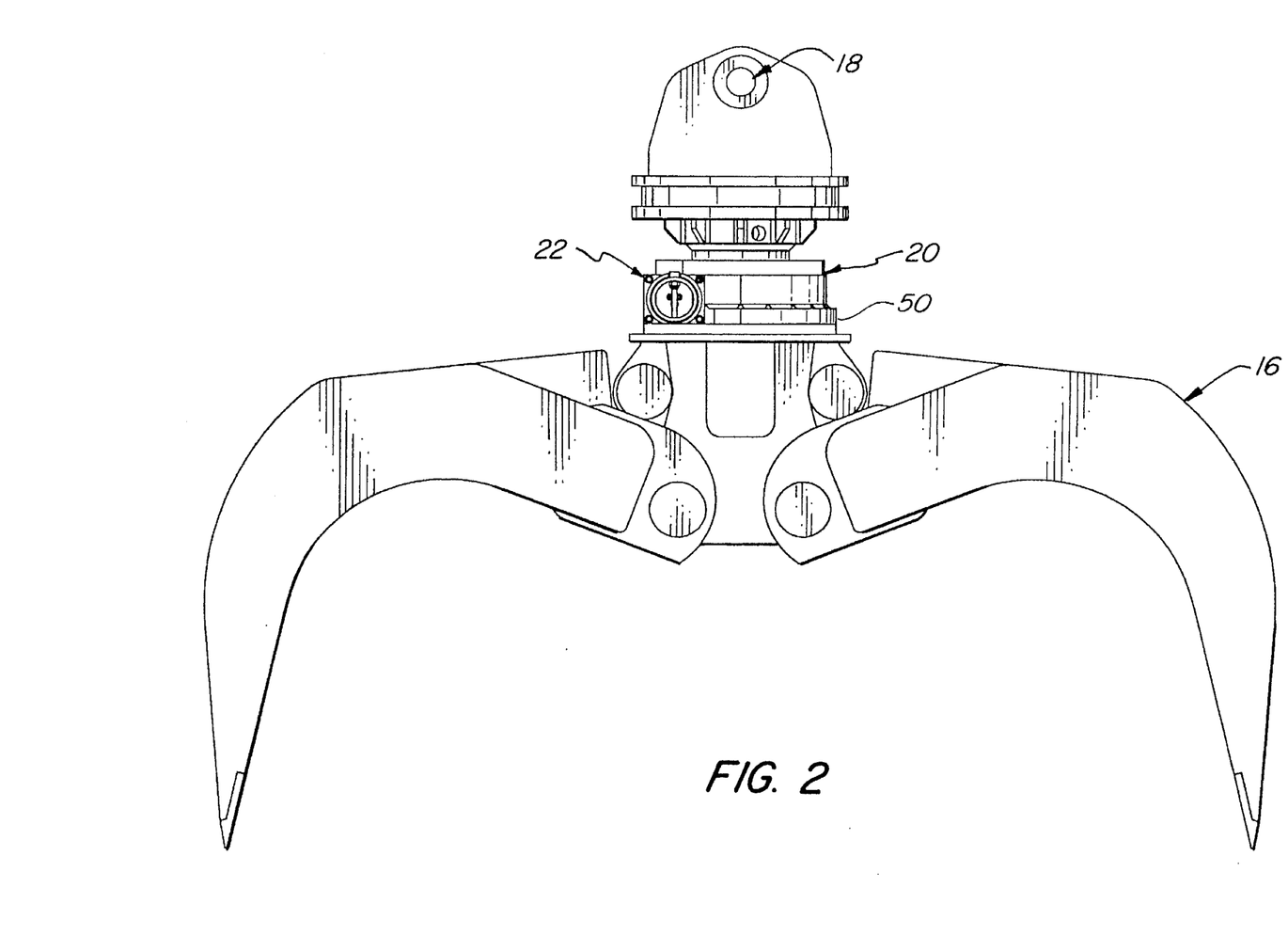
FIG. 2 is a side elevational view of the coupling and grapple drawn to an enlarged scale.
Figure 4:
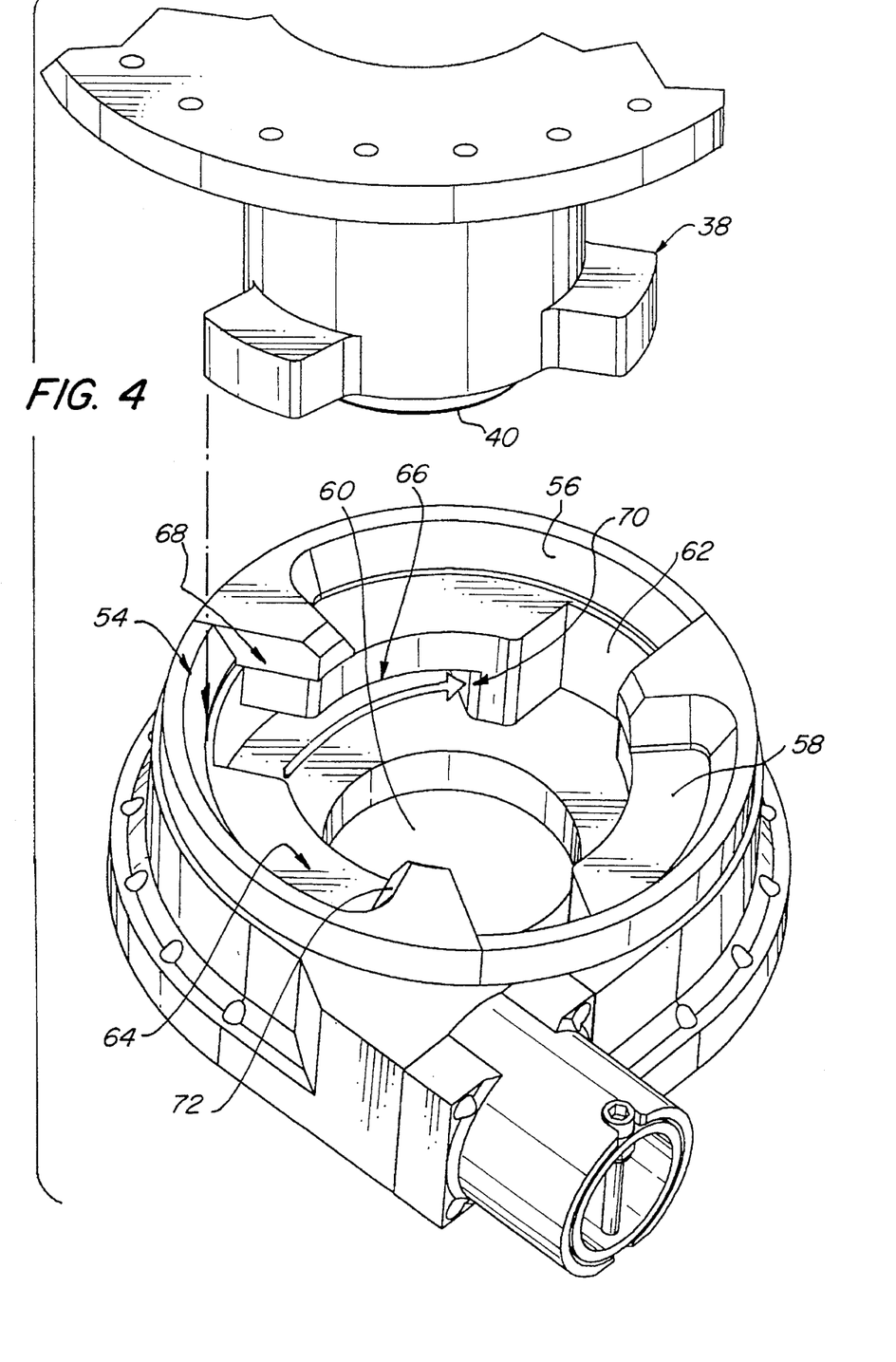
FIG. 4 is a fragmentary perspective view of the two components of the coupling being assembled with arrows showing the downward and rotational movement of the connector relative to the receiver; and, FIG. 5 is a sectional view of the coupling along line 5—5 of FIG. 2 drawn to a greatly enlarged scale and with arrows showing the axial and rotational movement of the locking mechanism.

Turning next in detail to the receiver 20 as shown in FIG. 2, the base 50 of the receiver 20 is affixed to the tool 16 by fasteners or welds. As illustrated in FIGS. 3 and 4, the upper end 52 of the receiver 20 has a generally circular cavity 54 and the upper end of the wall is chamfered to guide the connector 18 into a coaxial position in the receiver 20 during insertion of the connector 18 into the receiver 20.

Three circumferentially spaced arcuate ribs 58 extend radially inwardly of the circular cavity 54 intermediate its axial length to define an axially extending circular passage 60 centrally thereof and axially extending channels 62 between the ends thereof. The ribs 58 are circumferentially spaced at 120° intervals and are spaced apart to provide channels 62 of sufficient width to allow the lugs 38 of the connector 18 to move axially into the receiver 20 beyond the ribs 58. The upper surface of the ribs 58 facing the outer end of the receiver 20 forms a guide surface 64 for the lugs 38 of the connector 18 to slide along during relative rotation while the lower surface of the ribs 58 facing the inside of the receiver 20 forms a retention surface 66 to retain the lugs 38 of the connector 18 thereunder.

At one circumferential end of each of the ribs 58 is an upstanding stop 68, and at the other end is a depending stop 70. The outer face of the circumferential stops 68 extends above, and the outer face of the stops 70 extends below, the ribs 58 and cooperate to define the three axially extending channels 62. The radially extending inner faces of the upstanding stops 68 have chamfered surfaces to cam the lugs 38 of the connector 18 into a position aligned with the channels 62 of the receiver 20 when the connector 18 is inserted into the receiver 20. To effect engagement when the lugs 38 reach the bottom of the channels 62, the connector 18 is rotated in a clockwise direction to move the lugs 38 under the arcuate ribs 58 until the lugs 38 abut the lower stops 70.

The locking mechanism 22 is incorporated in the receiver 20 to preclude inadvertent rotation of the connector 18 in the circular passage 60 once the connector 18 is fully seated within the receiver 20. As illustrated in FIG. 3, the locking mechanism 22 includes a generally cylindrical shaft 74 coaxially mounted within the housing 76. The inner end portion 78 of the shaft 74 is of semicylindrical configuration providing a shoulder 80 spaced from the inner end 78. The end of the housing 76 adjacent the receiver 20 has a rectangular flange with holes 82 adjacent its corners to seat bolts (not shown) which secure the locking mechanism 22 to the receiver 20. The other end of the housing 76 spaced from the receiver 20 is a cylindrical sleeve which has two diametrically spaced notches 84 in the end and these are of unequal width.

The locking mechanism 22 further includes a tubular sleeve 86 which is movably and coaxially mounted within the housing 76 over the shaft 74. A cylindrical cap 88 fits coaxially within the sleeve 86 and is secured to the outer end (not shown) of the shaft 74 by fasteners (not shown) passing through bolt holes 90. The cap 88 has a pair of opposing circular mounting holes 92 which seat one end of the dowel pins 94. When assembled, the free ends of the dowels 94 are slidably seated in the axially extending slots 96 cut into the outer end of the sleeve 86. This assembled combination allows the sleeve 86 to slide back and forth on the shaft 74 and to transmit rotating motion to the shaft 74 once the cap 88 is positioned within the sleeve 86 and operably connected to the shaft 74 by the dowels 94.

The locking mechanism 22 also includes a handle 98 to enable an operator to lock and unlock the locking mechanism 22 by merely pulling and turning the handle 98. The handle 98 extends diametrically of the sleeve 86 has its ends projecting outwardly thereof to enable gripping. The handle 98 is secured within the sleeve 86 by the lock nut 100. The protruding ends of the handle 98 engage in the notches 84 of the housing 76 to lock the sleeve 86 against rotation when the locking mechanism 22 is in the locked position. In addition, the protruding ends of the handle 98 are of different diameter corresponding to the unequal width of the notches 84 so that the engagement of the handle 98 with the housing 76 is limited to one position only. As a result, when the mating protrusions of the handle 98 are rotated and aligned with the notches 84, they will only seat and engage when the coupling 14 is in a locked condition, i.e., when the end 78 of the shaft 74 abuts the lug 38. This serves as a visual indication to the operator of the locked status of the locking mechanism 22.

In order to disengage the locking mechanism 22 and free the lugs 38 of the connector 18 to rotate in a counterclockwise direction, the operator simply grasps the handle 98 and pulls it outwardly to disengage the handle 98 from the notches 84. The operator then rotates the sleeve 86 180° which turns the shaft 74 so that the flat diametrical surface of the end portion 78 is facing the lug 38. This frees the lug 38 on the connector 18 to rotate in the counterclockwise direction to enable disengagement of the coupling.

Figure 5:
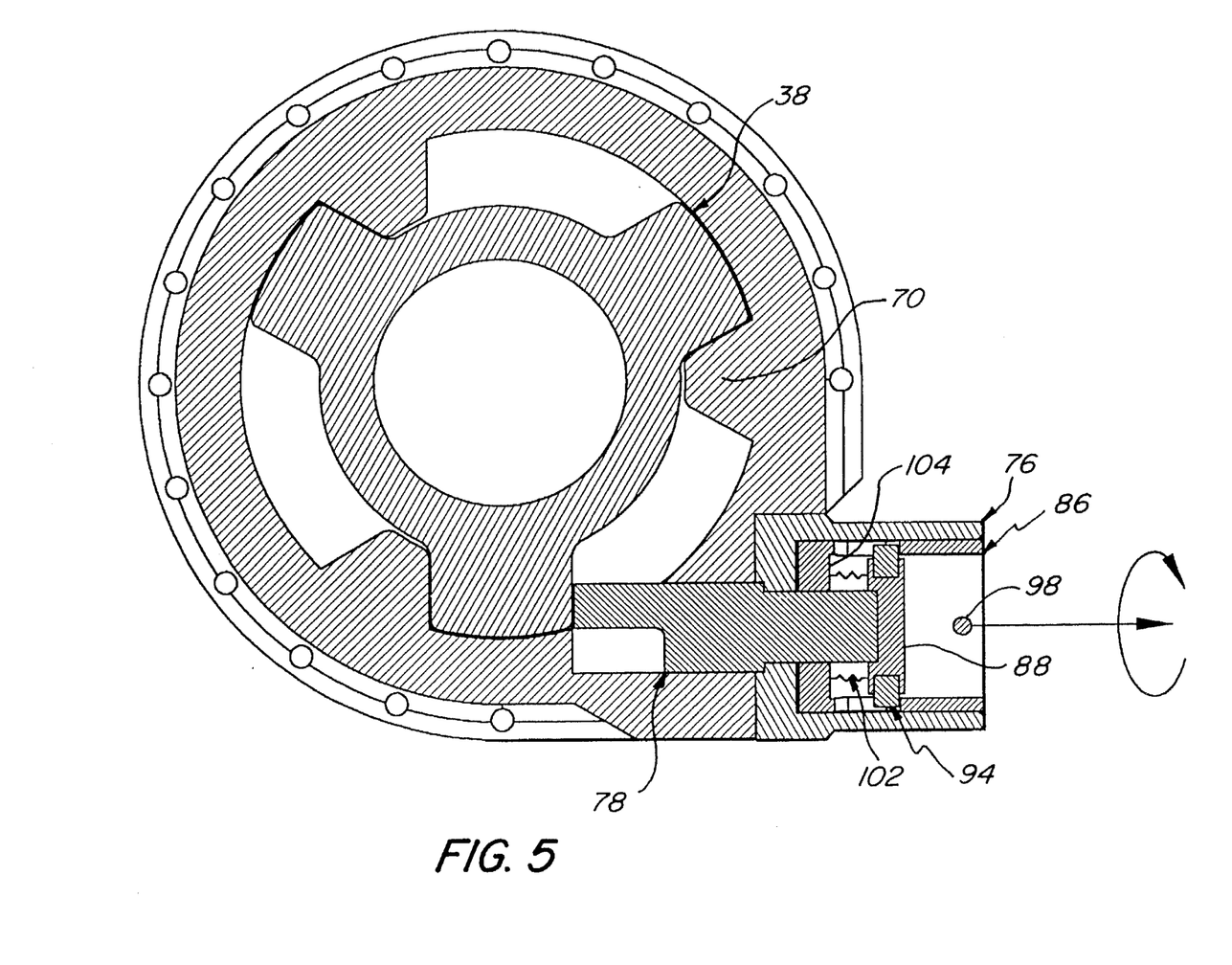

As best illustrated in FIG. 5, compression springs 102 are captured between an annular shoulder 104 at the inner end of the sleeve 86 and the cap 88 and work between them to provide a separation force between these two components. This force is resisted by the shaft shoulder 72 so the shaft 74 remains within the housing 76. Thus, the sleeve 86 is forced to move within the housing 76 and this forces the protrusions of the handle 98 into the notches 84. This engagement prevents the shaft 74 from rotating once locked.

In order to attach the tool 16 to the construction vehicle 10, the connector 18 on the boom 12 is positioned above the receiver 20 which is attached to the tool 16. The operator approximates coaxial alignment, and the connector 18 is lowered onto the receiver 20. The arrows in FIG. 4 show the insertion path which the connector 18 follows as it is inserted into the receiver 20. The lead-in taper 40 at the top of the circular cavity 54 and the tapered shoulders 72 along the upper stops 68 guide the connector 18 towards the circular passage 60 of the receiver 20 to coaxially align the connector 18 and the receiver 20. Once these axes are aligned, the lugs 38 rest on the guide surface 64 and the connector 18 is then rotated clockwise by the drive motor until the lugs 38 abut the upper stops 68. In this position, the lugs 38 of the connector 18 are axially aligned with the channels 62 of the receiver 20 and the lugs 38 can axially move further into the receiver 20. Once the lugs 38 are below the lower retention surface 66 of the ribs 58, the connector 18 is rotated clockwise until the lugs 38 abut the inner stops 70. At this point, the coupling 14 is fully engaged, but not yet locked in place.

To lock the coupling 14 and prevent disengagement of the connector 18 from the receiver 20, the operator manually pulls the handle 98 and rotates the sleeve 86 about 180°. This rotates the end 78 of the shaft 74 to locate its arcuate surface in an interfering position with one 0f the lugs 38 on the connector 18 and effectively captures this lug 38 beneath the retention surface 66, thereby the connector 18 within the receiver 20. At this point, the operator may connect hydraulic hoses (not shown) to the tool 16 from the oil delivery ports 48 of the oil distributor 42 if the tool 16 requires hydraulic power, and the tool 16 can now be operated and rotated on the rotatable turntable bearing 32. The coupling 14 may be disengaged by simply the reversing the order of the above steps.

The tapered surfaces of the connector and the receiver together with the guide surfaces and upper lugs on the receiver enable the operator of the construction vehicle to position the connector generally above the receiver, and then successfully engage the coupling without requiring numerous helpers to align the connector with the receiver, thereby saving both time and labor. In addition, the relative simplicity of the locking mechanism using only a single locking shaft is extremely durable and readily positioned into locking engagement.

As will be appreciated, the coupling mechanism can be fitted onto most hanging-type tools including clam shells, grapples, and magnets.

Moreover, the configuration of several components may vary from that which is illustrated in the accompanying drawings. For example, the receiver may be attached to the boom, and the connector may be attached to the tool, without departing from the invention. Alternatively, the locking mechanism may intersect the receiver axially or radially to abut a connector lug and preclude rotational movement.

Although various materials may be employed for the construction of the components of the coupling, preferably at least the interlocking surfaces of connector and receiver are constructed of hardened steel for maximum resistance to abrasion and long life.

Thus, it can be seen from the foregoing detailed description and the attached drawing that the novel coupling of the present invention is readily engaged and securely locked, and provides both pivotal and rotational movement for the tool attached to the boom of a material handler. Moreover, the coupling employs a single locking mechanism to make the assembly relatively easy and rapid as compared with conventional couplings which require multiple fasteners or relatively complex locking mechanisms.

Having thus described the invention, what is claimed is:

1. A coupling for releasably attaching a tool to a boom of a material handler, comprising:
   (a) a receiver having
      (i) attachment means on one end adapted for mounting on one of said tool and the boom of said material handler,
      (ii) a generally circular cavity in the other end thereof,
      (iii) a plurality of circumferentially spaced ribs of arcuate configuration extending radially inwardly of said cavity intermediate the axial length thereof and defining an axially extending circular passage centrally thereof and axially extending channels between the spaced ribs thereof, a surface of said ribs facing said other end providing a guide surface and an opposite surface providing a retention surface,
      (iv) first stops on one circumferential end of said ribs extending axially toward said other end of said receiver,
      (v) second stops on the other circumferential end of said ribs extending axially toward said one end of said receiver, the circumferential spacing between said ends of said ribs and said first and second stops defining said axially extending channels;

(b) a connector having
  (i) one end portion of generally circular cross section seated in said circular passage of said receiver,
  (ii) a plurality of circumferentially spaced, radially extending lugs adjacent the end of said one end portion extending under said retention surface of said ribs and abutting said second stops, said lugs being cooperatively dimensioned and configured with respect to said axially extending channels to permit passage of said lugs therethrough,
  (iii) attachment means on its other end adapted for mounting on the other one of the tool and boom; and,
(c) a locking member movably seated in a passage in said receiver, said locking member having
  (i) an inner end portion abutting one of said lugs to preclude rotation of said connector in said circular passage of said receiver; and
  (ii) means for effecting the movement of said inner end portion in said circular passage to free said one lug and thereby said connector for rotation,
whereby said connector may be coupled to said receiver by moving said connector axially into said passage in said one end of said receiver until said lugs abut said guide surface of said ribs, effecting relative rotation of said connector toward said axially extending channels until said lugs abut said first stops and are in axial alignment with said channels, axially moving said connector further into said circular passage of said receiver and said lugs axially in said channels, and effecting relative rotation until said lugs abut said second stops.

2. A coupling according to claim 1 wherein the circumferential surface of said circular cavity at said other end of said receiver tapers radially inwardly to guide said connector into a position coaxial with said circular passage of said receiver.

3. A coupling according to claim 1 wherein radial inner faces of said first stops have chamfered positions to guide said connector into a position coaxial with said passage of said receiver during insertion of said connector into said receiver.

4. A coupling according to claim 1 wherein said one end of said connector has a chamfered surface to guide said one end of said connector into a coaxial position in said circular passage during insertion of said connector into said receiver.

5. A coupling according to claim 1 wherein said first stops, second stops and lugs are equal in number.

6. A coupling according to claim 5 wherein said number is three, and wherein said first stops, second stops and said lugs are circumferentially spaced apart at 120° intervals.

7. A coupling according to claim 1 wherein said passage seating said locking member secantally intersects said circular passage of said receiver.

8. A coupling according to claim 7 wherein a body portion of said locking member is of generally cylindrical cross section and wherein said inner end portion thereof is of semicylindrical cross section with an arcuate surface abutting said one lug and wherein said means for effecting movement of said locking member in said passage includes means for effecting the rotation of said locking member between a first position where the arcuate surface of said semicylindrical inner end portion abuts said one lug and a second position wherein a planar surface of said semicylindrical inner end portion is disposed adjacent but spaced from said one lug to enable said connector to rotate, and means indicating whether said locking member is in the first or second position.

9. A coupling according to claim 7 wherein said means for effecting movement of said locking member includes means for effecting an axial movement of said locking member between a first axial position wherein a semicylindrical inner end portion is abutting said one lug and a second position in which said inner end portion is spaced from said one lug, and means indicating whether said locking member is in the first or second position.

10. A coupling according to claim 1 wherein said one end portion of said connector is of generally annular cross section and includes means for supplying hydraulic fluid in the passage therethrough to supply hydraulic power to the tool.

11. A coupling according to claim 10 wherein said means for supplying hydraulic fluid to said tool includes a cylindrical hydraulic oil distributor coaxially mounted within said annular end portion of said connector.

12. A coupling according to claim 1 wherein said connector includes a rotatable element to enable rotation of said one end portion relative to said receiver.

13. A coupling for releasably attaching a tool to a boom of a material handler, comprising:
(a) a receiver having
  (i) attachment means on one end adapted for mounting on one of said tool and the boom of said material handler,
  (ii) a generally circular cavity in the other end thereof,
  (iii) a plurality of circumferentially spaced ribs of arcuate configuration extending radially inwardly of said cavity intermediate the axial length thereof and defining an axially extending circular passage centrally thereof and axially extending channels between the spaced ribs thereof, a surface of said ribs facing said other end providing a guide surface and an opposite surface providing a retention surface,
  (iv) first stops on one circumferential end of said ribs extending axially toward said other end of said receiver,
  (v) second stops on the other circumferential end of said ribs extending axially toward said one end of said receiver, the circumferential spacing between said ends of said ribs and said first and second stops defining said axially extending channels;
(b) a connector having
  (i) one end portion of generally circular cross section seated in said circular passage of said receiver,
  (ii) a plurality of circumferentially spaced, radially extending lugs adjacent the end of said one end portion extending under said retention surface of said ribs and abutting said second stops, said-lugs being cooperatively dimensioned and configured with respect to said axially extending channels to permit passage of said lugs therethrough,
  (iii) attachment means on its other end adapted for mounting on the other one of said tool and said boom, and a circumferential surface of said circular cavity at said other end of said receiver tapering radially inwardly, said one end of said connector having a chamfered surface to guide said one end of said connector into a coaxial position in said circular passage during insertion of said connector into said receiver; and
(c) a locking member movably seated in a passage in said receiver, said locking member having
  (i) an inner end portion abutting one of said lugs to preclude rotation of said connector in said circular passage of said receiver; and (ii) means for effecting the movement of said inner end portion in said circular passage to free said one lug and thereby said connector for rotation, whereby said connector may be coupled to said receiver by moving said connector axially into said passage in said one end of said receiver until said lugs abut said guide surface of said ribs, effecting relative rotation of said connector toward said axially extending channels until said lugs abut said first stops and are in axial alignment with said channels, axially moving said connector further into said circular passage of said receiver and said lugs axially in said channels, and effecting relative rotation until said lugs abut said second stops.

14. A coupling according to claim 13 wherein there are three of said first stops, said second stops and said lugs which are circumferentially spaced apart at 120° intervals.

15. A coupling according to claim 13 wherein said passage seating said locking member secantally intersects said circular passage of said receiver, a body portion of said locking member is of generally cylindrical cross section and wherein said inner end portion thereof is of semicylindrical cross section with an arcuate surface abutting said one lug and wherein said means for effecting movement of said locking member in said passage includes means for effecting the rotation of said locking member between a first position where the arcuate surface of said semicylindrical inner end portion abuts said one lug and a second position wherein a planar surface of said semicylindrical inner end portion is disposed adjacent but spaced from said one lug to enable said connector to rotate, and means indicating whether said locking member is in the first or second position.

16. A coupling for releasably attaching a tool to a boom of a material handler, comprising:
   (a) a receiver having
      (i) attachment means on one end adapted for mounting on one of said tool and the boom of said material handler,
      (ii) a generally circular cavity in the other end thereof,
      (iii) a plurality of circumferentially spaced ribs of arcuate configuration extending radially inwardly of said cavity intermediate the axial length thereof and defining an axially extending circular passage centrally thereof and axially extending channels between the spaced ribs thereof, a surface of said ribs facing said other end providing a guide surface and an opposite surface providing a retention surface,
      (iv) first stops on one circumferential end of said ribs extending axially toward said other end of said receiver,
      (v) second stops on the other circumferential end of said ribs extending axially toward said one end of said receiver, the circumferential spacing between said ends of said ribs and said first and second stops defining said axially extending channels;
   (b) a connector having
      (i) one end portion of generally circular cross section seated in said circular passage of said receiver,
      (ii) a plurality of circumferentially spaced, radially extending lugs adjacent the end of said one end portion extending under said retention surface of said ribs and abutting said second stops, said lugs being cooperatively dimensioned and configured with respect to said axially extending channels to permit passage of said lugs therethrough,
      (iii) attachment means on its other end adapted for mounting on the other one of the tool and boom, said one end portion of said connector being of generally annular cross section and includes means for supplying hydraulic fluid in the passage therethrough to supply hydraulic power to the tool, said connector including a rotatable element to enable rotation of said one end portion relative to said receiver; and
   (c) a locking member movably seated in a passage in said receiver, said locking member having
      (i) an inner end portion abutting one of said lugs to preclude rotation of said connector in said circular passage of said receiver; and
      (ii) means for effecting the movement of said inner end portion in said circular passage to free said one lug and thereby said connector for rotation, whereby said connector may be coupled to said receiver by moving said connector axially into said passage in said one end of said receiver until said lugs abut said guide surface of said ribs, effecting relative rotation of said connector toward said axially extending channels until said lugs abut said first stops and are in axial alignment with said channels, axially moving said connector further into said circular passage of said receiver and said lugs axially in said channels, and effecting relative rotation until said lugs abut said second stops.

17. A coupling according to claim 16 wherein said means for supplying hydraulic fluid to said tool includes a cylindrical hydraulic oil distributor coaxially mounted within said annular end portion of said connector.

18. A coupling according to claim 16 wherein said passage seating said locking member secantally intersects said circular passage of said receiver.

19. A coupling according to claim 16 wherein a body portion of said locking member is of generally cylindrical cross section and wherein said inner end portion thereof is of semicylindrical cross section with an arcuate surface abutting said one lug and wherein said means for effecting movement of said locking member in said passage includes means for effecting the rotation of said locking member between a first position where the arcuate surface of said semicylindrical inner end portion abuts said one lug and a second position wherein a planar surface of said semicylindrical inner end portion is disposed adjacent but spaced from said one lug to enable said connector to rotate, and means indicating whether said locking member is in the first or second position.

* * * * *